(12) United States Patent
Erlihson et al.

(10) Patent No.: US 10,198,203 B2
(45) Date of Patent: Feb. 5, 2019

(54) METHOD OF OPERATING MEMORY DEVICE USING PSEUDO-RANDOM FUNCTIONS, MEMORY DEVICE USING THE SAME AND MEMORY SYSTEM INCLUDING THE DEVICE

(71) Applicant: SAMSUNG ELECTRONICS CO., LTD., Suwon-si, Gyeonggi-Do (KR)

(72) Inventors: Michael Erlihson, Ramat Gan (IL); Shmuel Dashevsky, Ramat Gan (IL); Elona Erez, Ramat Gan (IL); Guy Inbar, Ramat Gan (IL); Jun Jin Kong, Yongin-si (KR); Keon Soo Ha, Anyang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 44 days.

(21) Appl. No.: 15/352,037

(22) Filed: Nov. 15, 2016

(65) Prior Publication Data

US 2018/0136865 A1    May 17, 2018

(51) Int. Cl.
| | |
|---|---|
| *G06F 13/00* | (2006.01) |
| *G06F 3/06* | (2006.01) |
| *G06F 12/02* | (2006.01) |
| *G06F 12/0866* | (2016.01) |

(52) U.S. Cl.
CPC .......... *G06F 3/0626* (2013.01); *G06F 3/0659* (2013.01); *G06F 3/0665* (2013.01); *G06F 3/0679* (2013.01); *G06F 12/0246* (2013.01); *G06F 12/0866* (2013.01); *G06F 2212/1044* (2013.01); *G06F 2212/1056* (2013.01); *G06F 2212/152* (2013.01); *G06F 2212/214* (2013.01); *G06F 2212/466* (2013.01); *G06F 2212/7201* (2013.01); *G06F 2212/7203* (2013.01); *G06F 2212/7208* (2013.01)

(58) Field of Classification Search
None
See application file for complete search history.

(56) References Cited

U.S. PATENT DOCUMENTS

| | | | | |
|---|---|---|---|---|
| 4,361,868 | A * | 11/1982 | Kaplinsky | G06F 12/10 711/2 |
| 5,796,978 | A * | 8/1998 | Yoshioka | G06F 12/1027 711/206 |
| 8,938,479 | B1 * | 1/2015 | Dwivedi | G06F 17/30091 707/696 |
| 2009/0292865 | A1 * | 11/2009 | Hong | G06F 3/0613 711/103 |

(Continued)

*Primary Examiner* — Sean D Rossiter
(74) *Attorney, Agent, or Firm* — F. Chau & Associates, LLC.

(57) ABSTRACT

A memory system includes a table storing a plurality of entries, where each entry is associated with a different logical block address (LBA), a plurality of memory devices, channels, and ways, where each memory device is connected to one of the channels ways and to one of the ways, and a memory controller configured to receive an LBA and data from a host, execute a plurality of pseudo-random functions on the received LBA to generate a plurality of slot indexes, select one of the slot indexes, write the data to one of the memory devices identified by the selected one slot index, and update a corresponding one of the entries to include the selected one slot index.

20 Claims, 18 Drawing Sheets

(56) References Cited

U.S. PATENT DOCUMENTS

| | | | |
|---|---|---|---|
| 2010/0268967 A1* | 10/2010 | Senda | G06F 21/575 |
| | | | 713/193 |
| 2011/0238899 A1* | 9/2011 | Yano | G06F 12/0246 |
| | | | 711/103 |
| 2012/0226889 A1* | 9/2012 | Merriman | G06F 17/30333 |
| | | | 711/216 |
| 2015/0081952 A1* | 3/2015 | D'Abreu | G06F 12/0246 |
| | | | 711/103 |
| 2016/0054930 A1* | 2/2016 | Dor | G06F 3/0608 |
| | | | 711/102 |
| 2016/0110252 A1* | 4/2016 | Hyun | G11C 29/52 |
| | | | 714/766 |

* cited by examiner

FIG. 12

| Class<br>In-class<br>Index | 0 | 1 | 2 | ... | 19 | ... | 31 |
|---|---|---|---|---|---|---|---|
| 0 | 2017 | 14 | 893 | ... | 141 | ... | 3443 |
| 1 | 22 | 112 | 3912 | ... | 399 | ... | 121 |
| ... | | | | | | | |
| 127 | 1 | 1053 | 65 | ... | 323 | ... | 745 |

517

Block 399 belongs to class 19 and in-class index 1.

FIG. 14

| LBA | Allowed slots |
|---|---|
| 199 | (15,1) (1,3) (16,4) (16,2) (4,3) (10,4) (10,1) (16,3) |
| 32 | (1,3) (16,4) (4,1) (12,2) (6,4) (13,3) (11,4) (9,2) |
| 123 | (2,4) (5,2) (15,3) (4,3) (6,4) (2,3) (10,3) (3,4) |
| 198 | (12,4) (6,3) (11,2) (7,1) (10,3) (16,1) (14,2) (12,3) |
| 122 | (14,2) (2,1) (10,4) (10,1) (9,1) (5,2) (4,4) (7,3) |
| 55 | (14,1) (16,4) (1,3) (9,2) (2,3) (13,1) (15,3) (16,3) |
| 121 | (1,3) (1,4) (13,2) (9,2) (14,3) (16,1) (10,2) (3,1) |
| ... | ... |
| 14 | (4,1) (1,4) (2,4) (10,3) (15,2) (6,2) (7,1) (1,1) |
| 16 | (12,1) (16,4) (13,1) (6,2) (2,3) (4,4) (5,3) (10,4) |
| 17 | (7,1) (10,3) (12,4) (10,1) (9,3) (16,2) (8,3) (2,2) |
| 31 | (1,1) (2,2) (16,2) (16,3) (14,3) (7,4) (7,1) (4,2) |
| 51 | (1,2) (12,3) (13,2) (11,4) (1,2) (13,3) (14,3) (12,1) |

US 10,198,203 B2

METHOD OF OPERATING MEMORY DEVICE USING PSEUDO-RANDOM FUNCTIONS, MEMORY DEVICE USING THE SAME AND MEMORY SYSTEM INCLUDING THE DEVICE

BACKGROUND

1. Technical Field

Exemplary embodiments of the present inventive concept relate to a method of operating a memory device, a memory device using the same and a memory system including the device.

2. Discussion of Related Art

A solid-state drive (SSD) is a solid-state storage device that uses integrated circuit assemblies as memory to store data persistently. SSD technology primarily uses electronic devices compatible with traditional block input/output (I/O) hard disk drives. Compared with electromechanical disks, SSDs are typically more resistant to physical shock, run silently, have lower access time, and lower latency.

An SSD may include a dynamic random access memory (DRAM) as a cache and a plurality of non-volatile memories for longer term storage. A large portion of the DRAM is devoted to a logical-to-physical address (L2P) table, which is used to convert logical addresses of a host into physical addresses within memory of the SSD. The size of the DRAM can be reduced by switching to a 2× coarse granularity SSD access (e.g., 16 KB host-pages instead of 8 KB host-pages). However, such an access method increases write amplification due to mismatch with a host granularity. The size of the DRAM may also be reduced by storing most of the L2P table in one of the non-volatile memories. However, with random workloads, many writes to the non-volatile memory are needed to maintain the L2P table. Further, random workloads may cause many cache misses, which requires the L2P table to be read more often from the non-volatile memory, thereby increasing latency and degrading throughput.

Thus, there is a need for methods of operating an SSD that enable a smaller DRAM to be used with little or no increase to write amplification and without use of a coarse granularity access.

SUMMARY

According to an exemplary embodiment of the inventive concept, a memory system includes a table storing a plurality of entries, where each entry is associated with a different logical block address (LBA), a plurality of memory devices, channels, and ways, where each memory device is connected to one of the channels, ways and to one of the ways, and a memory controller configured to receive an LBA and data from a host, execute a plurality of pseudo-random functions on the received LBA to generate a plurality of slot indexes, select one of the slot indexes, write the data to one of the memory devices identified by the selected one slot index, and update a corresponding one of the entries to include the selected one slot index.

According to an exemplary embodiment of the inventive concept, a method of writing data to a memory system includes: determining, by a memory controller, a logical block address (LBA) that is requested to be written with data by a host; executing, by the memory controller, a plurality of pseudo-random functions on the LBA to generate a plurality of slot indexes; selecting, by the memory controller one of the slot indexes; writing, by the memory controller, the data to one of a plurality of memory devices identified by the selected one slot index; and updating, by the memory controller, an entry of a table associated with the LBA to include the selected one slot index.

According to an exemplary embodiment of the inventive concept, a method of reading data from a memory system includes: determining, by a memory controller, a logical block address (LBA) of a page that is requested to be read by a host; accessing, by the memory controller, a table using the determined LBA to retrieve a slot index; executing, by the memory controller, one of a plurality of pseudo-random functions identified by the retrieved slot index on the determined LBA to generate a channel number, a way number, a plane number; and reading the data from a memory device identified by the generated channel number, the generated way number, and the generated plane number.

According to an exemplary embodiment of the inventive concept, a memory system includes a table storing a plurality of entries, where each entry is associated with a different logical block address (LBA), a plurality of memory devices, channels, ways and planes, where each memory device is connected to one of the channels ways and to one of the ways, and a memory controller configured to receive an LBA from a host, access a table using the LBA to retrieve a slot index, execute one of a plurality of pseudo-random functions identified by the slot index to generate a channel number, a way number, and a plane number and read data from one of a plurality of memory devices using the generated channel number, the generated way number and the generated way number.

BRIEF DESCRIPTION OF THE DRAWINGS

The present inventive concept will become more apparent by describing in detail exemplary embodiments thereof with reference to the attached drawings, in which:

FIG. 12 illustrates a block map that may be used in exemplary embodiment of the inventive concept;

FIG. 14 illustrates increasing the number of slots to reduce wasted slots according to an exemplary embodiment of the inventive concept;

DETAILED DESCRIPTION

Figure 1:
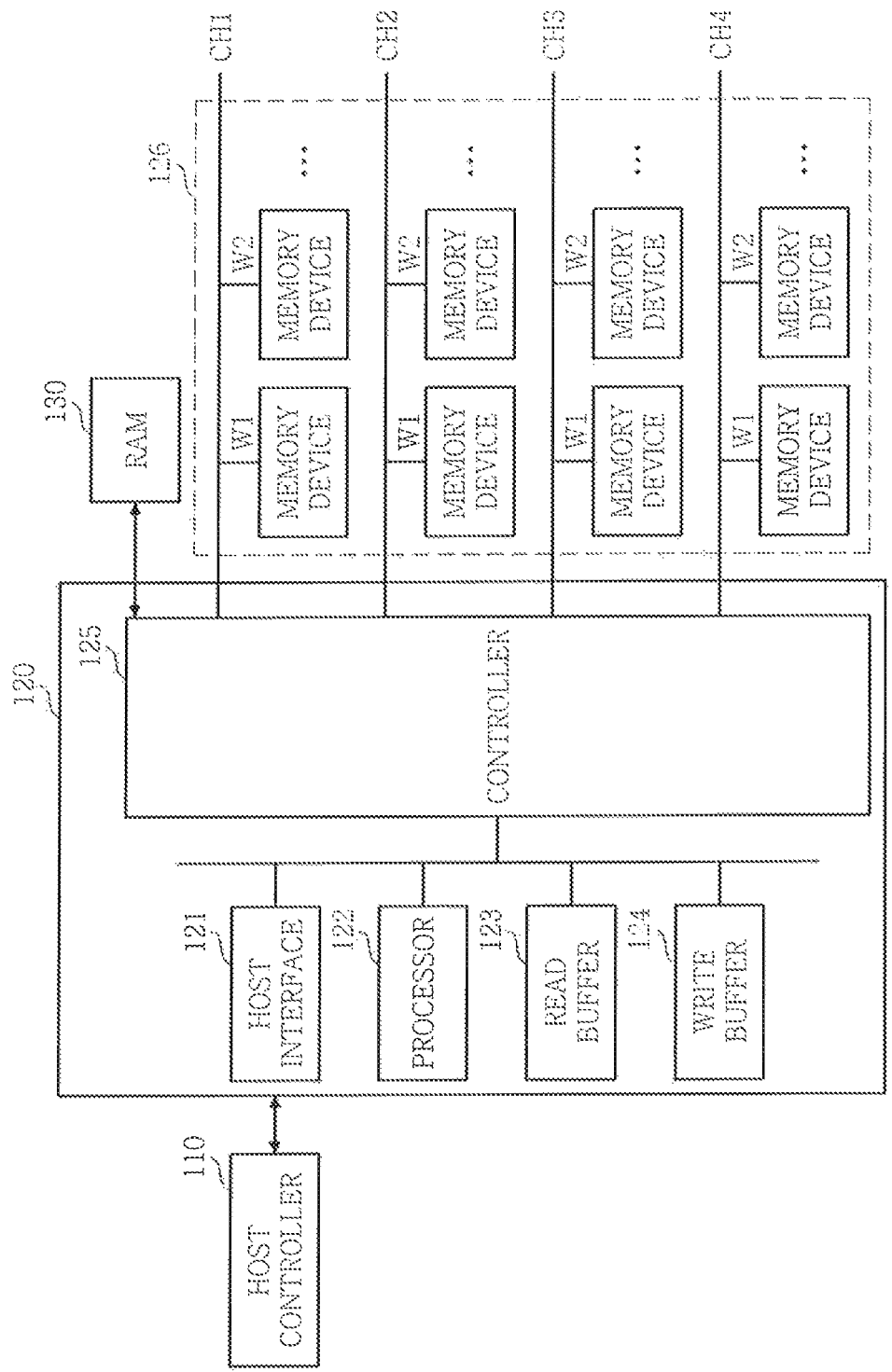
FIG. 1 is a block diagram illustrating a memory device in accordance with an exemplary embodiment of the present inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 is a block diagram illustrating a memory system in accordance with an exemplary embodiment of the inventive concept.

Referring to FIG. 1, the memory system includes a host controller 110 and a solid date device (SSD) controller 120 (e.g., a memory controller).

The host controller 110 controls read and write operations of the SSD controller 120 and may correspond to a central processing unit (CPU), for example. The SSD controller stores data when performing a write operation and outputs stored data when performing a read operation under the control of the host controller 110. The SSD controller includes a host interface 121, a processor 122, a read buffer 123, a write buffer 124, and an access controller 125. The access controller 125 is configured to interfaces with a RAM 130 (e.g., a DRAM) and a plurality of memory devices 126.

For example, the RAM 130 may be used to store a L2P table and as a cache. The memory devices 126 may include one or more non-volatile memory devices. In an embodiment, the non-volatile memory devices are flash memories (e.g., NAND or NOR type). In an embodiment, the memory devices 126 may be implemented with a variety of non-volatile memory devices such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

In an embodiment, a memory of the memory devices 126 includes a three-dimensional (3D) memory array. The 3D memory array may be monolithically formed in one or more physical level(s) of a memory cell array having an active area arranged on a circuit related on a silicon substrate and an operation of memory cells. The circuit related to an operation of memory cells may be located in a substrate or on a substrate. The term "monolithic" means that layers of each level of the array are directly deposited on the layers of each underlying level of the array.

In an embodiment of the inventive concept, the 3-dimensional memory array has a vertical-directional characteristic, and may include vertical NAND strings in which at least one memory cell is located on another memory cell. The at least one memory cell may comprise a charge trap layer. Each vertical NAND string may include at least one select transistor located over memory cells. The at least one select transistor having the same structure with the memory cells and being formed monolithically together with the memory cells.

The following patent documents, which are hereby incorporated by reference, describe suitable configurations for three-dimensional memory arrays, in which the three-dimensional memory array may be configured as a plurality of levels, with word lines and/or bit lines shared between levels: U.S. Pat. Nos. 7,679,133; 8,553,466; 8,654,587; 8,559,235; and US Pat. Pub. No. 2011/0233648.

The host controller 110 exchanges signals with the SSD controller 120 through the host interface 121, and the processor 122 controls the access controller 125. The read buffer 123 receives data stored in the plurality of memory devices 126 and outputs the received data when a read operation is performed, and the write buffer 124 receives external data when a write operation is performed. Further, the access controller 125 controls an access operation a memory device in which data will be stored among the plurality of memory devices 126 when a write operation s performed and controls an access operation on a memory device in which data to be outputted is stored among the plurality of memory devices 126 when a read operation is performed. Each of the plurality of memory devices 126 stores data when a write operation is performed and outputs stored data when a read operation is performed.

Each of the plurality of memory devices 126 in accordance with an embodiment of the present invention has a multi-plane structure to be described with reference to FIG. 2. The access controller 125 controls each of the multiple planes so that each of the multiple planes is accessed as one unit memory. That is, in a memory system in accordance with an embodiment of the present invention, an access unit on the plurality of memory devices 126 is a plane.

Figure 2:
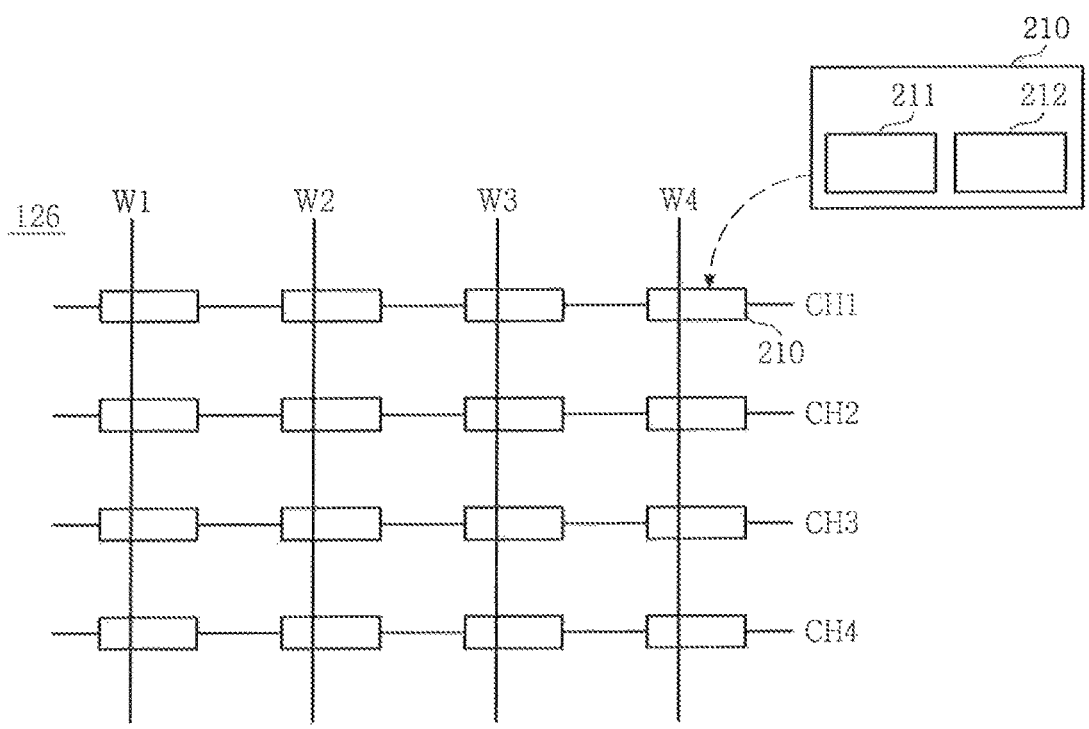
FIG. 2 is a block diagram illustrating a plurality of memory devices shown in FIG. 1.

FIG. 2 is a block diagram of the plurality of memory devices 126 shown in FIG. 1.

Referring to FIG. 2, the arrangement of each of the plurality of memory devices 126 is defined by a plurality of channels and a plurality of ways. For convenience of description, it is assumed that each number of the channels and the ways is 4. That is, the arrangement of 16 memory devices 126 may be defined by a first to a fourth channels CH1, CH2, CH3, and CH4 and a first to a fourth ways W1, W2, W3, and W4. Here, a channel is connected with a plurality of corresponding memory devices as shown in FIG. 1.

As described above, the arrangement of the plurality of memory devices 126 defined by the channels and the ways. That is, the plurality of memory devices 126 is disposed at cross points of channels in one direction and ways in the other direction, which means that the arrangement of each of the plurality of memory devices 126 may be defined by a coordinate system, which the channels and ways create.

Each of the plurality of memory devices 126 has one or multiple planes. One (for example, a memory device 210) of the plurality of memory devices 126 is described below as an example.

The memory device 210 includes first and second planes 211 and 212, that is, multiple planes. Here, a plane means a unit memory in which data is stored. A memory cell array or a page buffer may be the plane. Meanwhile, one memory device may have two or more planes. It is hereinafter assumed that the memory device 210 includes the first and second planes 211 and 212, that is, two planes, for convenience of description. Accordingly, the 16 memory devices 126 include 32 planes, and an access operation on each of the planes is controlled by the access controller 125 (refer to FIG. 1).

Figure 3:
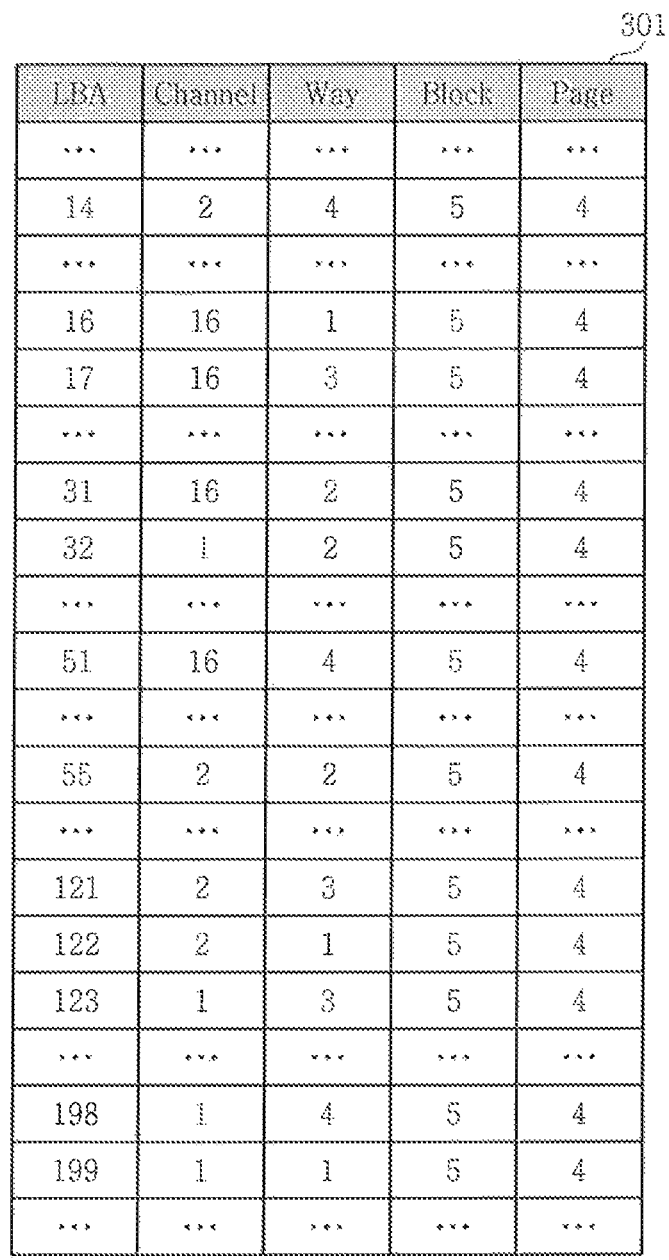
FIG. 3 is a L2P table for reference.

When a host (e.g., a host device including the host controller 110) desires to write a given page (e.g., a 8 KB page, a 16 KB page, etc.) corresponding to a given logical block address (LBA), the controller 125 decides on a channel and way (pair) when only one plane is present or decides on a channel, a way, and a plane (triplet) when multiple planes are available. A unique one of the memory devices may be identified by the pair or the triplet. The controller 125 also decides on a block (e.g., an empty block) among a plurality of memory blocks of the identified memory device and a page among a plurality of pages in the block in which to write the given page. The controller 125 creates or updates a L2P table (e.g., see 301 in FIG. 3) using the decided information. The L2P table 301 may be sorted by LBA. For example, if the L2P table is currently representing LBAs 1 to 200, then there would be 200 entries, where the first entry would correspond to LBA 1, the second entry would correspond to LBA 2, . . . , and the last entry would correspond to LBA 200. For example, the $1^{st}$ entry of FIG. 3 shows an example where the LBA was 14, the decided pair was (2,4), the decided block was 5, and the decided page was 4. The L2P table 301 is configured based on the assumption that 16 channels and 4 ways are available.

While the LBA is shown in FIG. 3 as a separate column, in practice, this column is omitted, since the order of the entry can be used to determine its LBA. In FIG. 3, all the host pages (e.g., host pages corresponding to LBA 14, 16, 17, 199) were stored in the same superpage. In the present disclosure, a superpage includes the pages across all channels, ways and planes that have the same block number and same page number. In an exemplary embodiment, the controller 125 can be configured to write one superpage at a time.

In FIG. 3 storing a channel and way require 6 bits per host page. In the L2P 301 depicted in FIG. 3, there is only 1 plane, and accordingly, the plane column is not necessary. However, when multiple planes are available, each entry additionally identifies one of the planes. If there were 8 ways instead of 4 ways, and 4 planes instead of 1 plane, then it would require 9 bits per host page. The L2P 301 may be stored in RAM 130. In an embodiment of the invention, the channel and way columns are replaced with a single column, so that the L2P 301 of FIG. 3 is reduced in size. Accordingly, a smaller size RAM 130 may be used.

Figure 4:
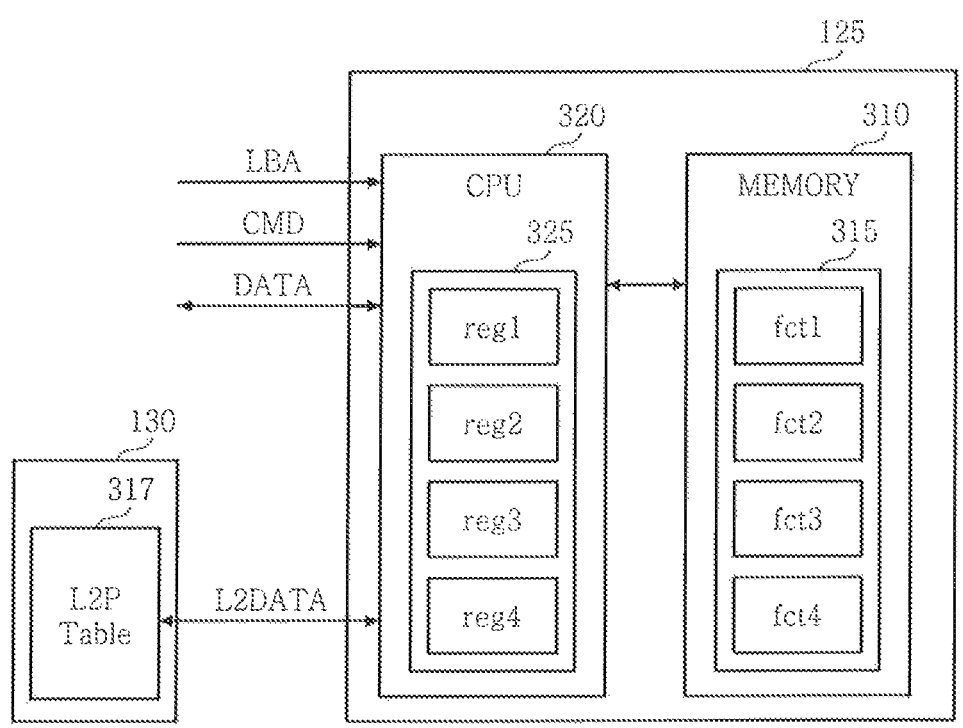
FIG. 4 is a block diagram of a controller used to generate a L2P table according to an exemplary embodiment of the inventive concept.
Figure 5:
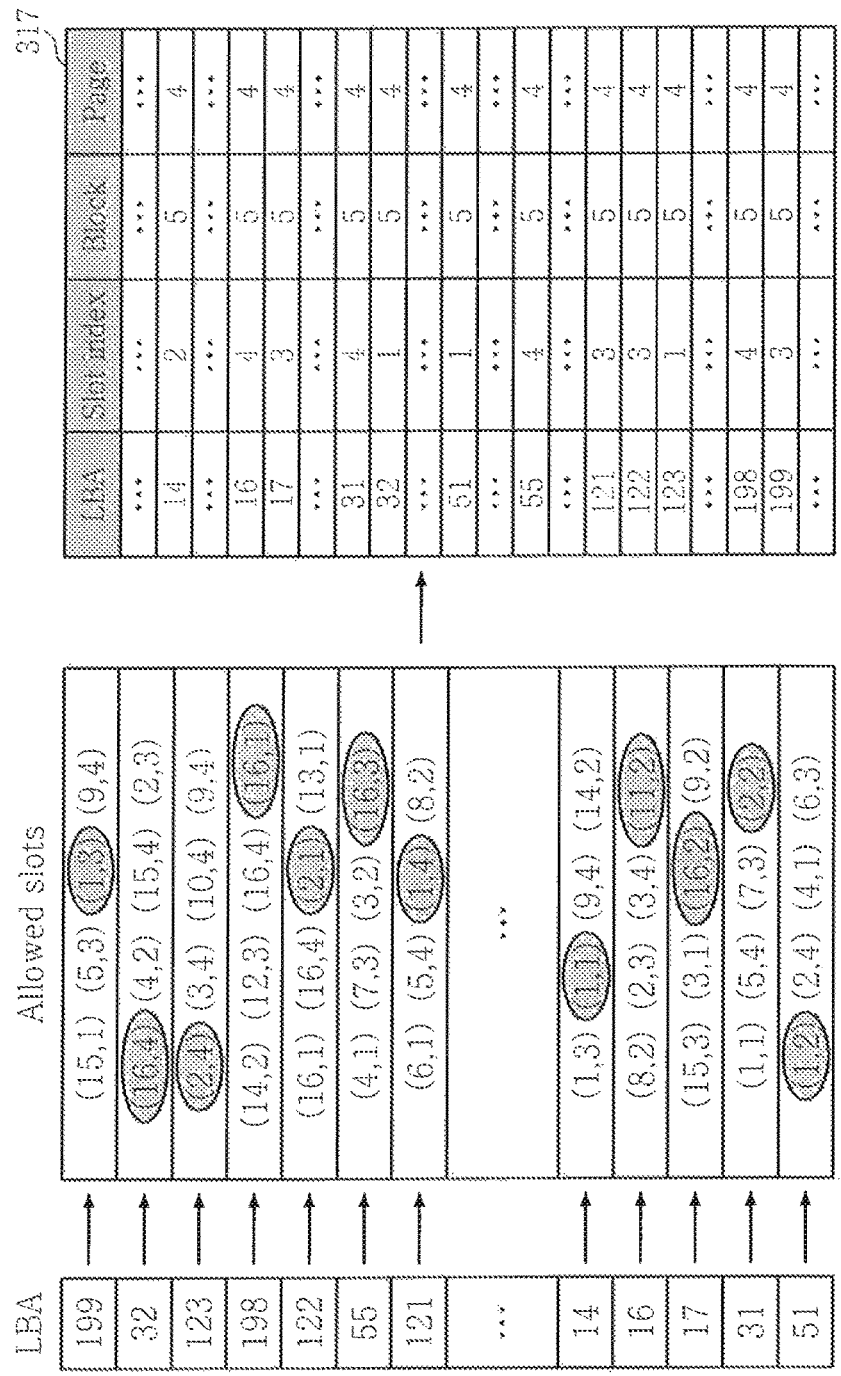
FIG. 5 illustrates the controller generating the L2P table.

FIG. 4 illustrates the controller 125 according to an exemplary embodiment of the inventive concept that is configured to generate a new L2P table 317. FIG. 5 illustrates a process of generating the new L2P table 317 according to an exemplary embodiment of the inventive concept.

The controller 125 is configured to receive at least one LBA, at least one command CMD (e.g., a write command, a read command, etc.), and data DATA (e.g., data to write) from the host. The controller 125 includes a CPU 320 and a memory 310. The CPU 320 may include at least one register 325 and the memory 310 may include at least one pseudo-random function 315. In this example, there are 4 such functions (e.g., fct1, fct2, fct3, and fct4) and one register for each function (e.g., reg1, reg2, reg3, and reg4).

A function includes executable code that is loaded from memory 310 by the CPU 320, the loaded function is executed by the CPU 320 and operates on an LBA to generate a slot. Thus, if four functions are present, four slots are generated for a single LBA. The CPU 320 selects one of the generated slots, determines a slot index for the selected one slot, and updates an entry of the L2P table 317 associated with the LBA using the slot index. For example, the CPU 320 updates an entry of the L2P table 317 by sending L2P data (e.g., L2PDATA) the entry to the RAM 130. For example, the L2PDATA may include at least one of slot index, the LBA, a block number, a page number, and a plane number.

FIG. 5 shows an example of a host requesting the writing of 64 pages, where the first page has an LBA of 199, the second page has an LBA of 32 and the last page has an LBA of 51. In this example, it is assumed that the controller 125 is configured with 4 functions and to communicate with an arrangement of memory devices comprising 16 channels, 4 ways, and 1 plan. Each function is configured to generate a pseudo-random pair of numbers froth a given LBA, where a first number of the pair identifies one of the available channels and the second remaining number of the pair identifies one of the available ways. Pseudo-random here means that the output of a given one f the functions appears random based on the value input to the corresponding function. However, the functions are designed so that they always generate the same pair of values when operated on a given LBA. For example, the first function will always generate the same first pair when operated on a LBA, the second function will always generate the same second pair when operated on the same LBA, the third function will always generate the same third pair using the same LBA, and the fourth function will always generate the same fourth pair using the same LBA. Further, the first, second, third, and fourth pairs all have distinct values since the functions are all different from one another.

Figure 6:
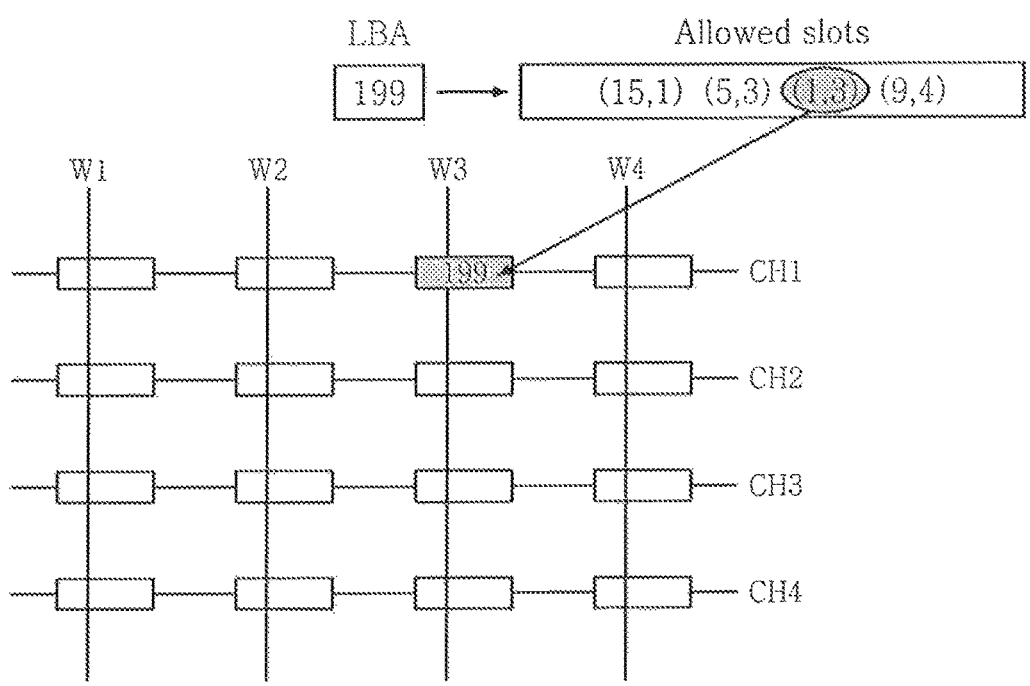
FIG. 6 illustrates the controller writing data to a memory device using the L2P table according to an exemplary embodiment of the inventive concept.

In the example shown in FIG. 5 with reference to the first try of the list of Allowed slots, the first function (e.g., fct1) is operated on a LBA of 199 to generate a first pair of (15,1) (also referred to as a first slot), the second function (e.g., fct2) operates on the same LBA of 199 to generate a second pair of (5,3) (also referred to as a second slot), the third function (e.g., fct3) is operated on the same LBA of 199 to generate a third pair of (1,3) (also referred to as third slot), and the fourth function (e.g., fct4) is operated on the same LBA of 199 to generate a fourth pair of (9,4) (also referred to as a fourth slot). For example, upon receiving the LBA of 199 from the host, the controller 125 uses the 4 functions to generate the 4 corresponding slots. Each generated slot (e.g., represented by a pair of numbers such as 1,3) may be stored temporarily in one of the registers 325. For example, the first generated slot of (15,1) could be stored in the first register reg1, the second generated slot of (5,3) could be stored in the second register reg2, the third generated slot of (1,3) could be stored in the third register reg3, and the fourth generated slot of (9,4) could be stored in the fourth register reg4. The controller 125 analyzes the 4 generated slots and chooses one based on the analysis. The analysis may be designed to minimize collisions. In the first entry of FIG. 5, the third slot represented by a channel of 1 and a way of 3 is chosen by the controller 125. As shown in FIG. 6, the controller 125 can then write the data of the received page associated with the LBA of 199 to one of the memory devices 126 that is along channel 1 and way 3. The controller 125 then converts the index (e.g., slot index) of the chosen slot to a value, and updates the slot index of the entry associated with the received LBA using the value. For example, since the third slot was chosen, the slot index in the entry of the L2P table 317 associated with the received LBA of 199 is set to 3. The process is then repeated for each received LBA.

Once the L2P table 317 is generated, it can be referenced in the future for subsequent reads. For example, if the host desires to read a page associated with the LBA of 199, it can apply the LBA and a read command to the controller 125. The controller 125 then accesses the entry of the L2P table 317 associated with an LBA of 199 to retrieve the slot index of 3, the block of 5, and the page of 4. Since the slot index is 3, the controller 125 knows to operate the corresponding third function (e.g., fct3) on the LBA of 199 to re-generate a channel of 1 and a way of 3. Then, the controller 125 accesses the memory of the memory devices along the re-generated channel of 1 and way of 5 at block 5, and page 4 to retrieve the requested page of data. The controller 125 then outputs the requested page as data DATA to the host.

While the above describes four functions each being configured to generate respective pairs identifying a channel and a way, when the memory devices include multiple planes, the functions are configured to generate triplets identifying a channel, a way, and a plane based on an input LBA. In this case, rather than the third function generating (1,3) for an LBA of 199, the third function could generate (1,3,2), for example to identify the second plane. Thus, when the controller 125 later attempts to read from an LBA of 199, it would convert the slot index of 3 into a channel of 1, a way of 3, and a plane of 2. While the above described use of four functions, the inventive concept is not limited thereto. For example, the controller 125 may be configured to support less than four functions (e.g., 2, 3, etc.) or more than four functions (e.g., 5, 6, etc.).

Figure 7:
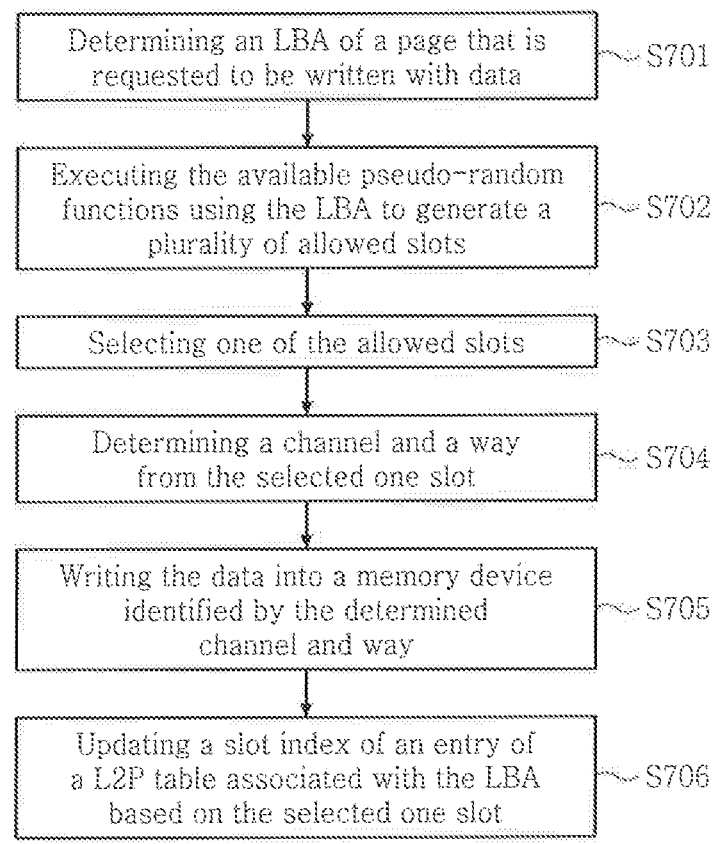
FIG. 7 illustrates a method of writing data to a memory device according to an exemplary embodiment of the inventive concept.

FIG. 7 illustrates a method of writing data to a memory system including a plurality of memory devices according to an exemplary embodiment of the inventive concept.

Referring to FIG. 7, the method includes determining an LBA of a page that is requested to be written with data (S701). The determination may be performed by controller 125 in response to a write request received from the host. The host controller 110 may send the write request to the SSD controller 120. The host interface 121 may pass the write request to the controller 125. The write request may include the LBA, a write command, and the data to be written. The write request The method then includes executing the available pseudo-random functions using the LBA to generate a plurality of allowed slots (S702). The pseudo-random functions may correspond to the functions 315 illustrated in FIG. 4. The allowed slots may correspond to the allowed slots of a given row of a table shown in FIG. 5. Each allowed slot identifies a channel, a way, and may optionally additionally identify a plane. The write buffer 124 may used to store a pre-determined number of write requests in a LBA list. For example, if the LBA list is size to store 64 write requests, and the host requests writes to 64 pages, the LBA list would be full.

The method then includes selecting one of the allowed slots (S703). For example, the controller 125 could include selecting one of the allowed slots that is designed to minimize collisions.

The method then includes determining a channel and a way from the selected one slot (S704). When the memory devices 126 have multiple planes, a plane may also be identified from the one slot.

The method then includes writing the data into a memory device (e.g., 210) identified by the determined channel and way (S705). When the memory devices 126 have multiple planes, the channel, way, and plane are determined from the selected slot, and the memory device is identified using the determined channel, way, and plane. The writing may include determining a block within the identified memory device and page within the block using the LBA, and writing the data to the page.

The method may include updating a slot index of an entry of a L2P table associated with the LBA based on the selected one slot (S706). For example, if the selected slot is associated with a first one of the functions 315, the slot index would be 1 and if the selected slot is associated with a second one of the functions 315, the slot index would be 2. The updating of the L2P table may be performed before or after the writing is performed.

Figure 8:
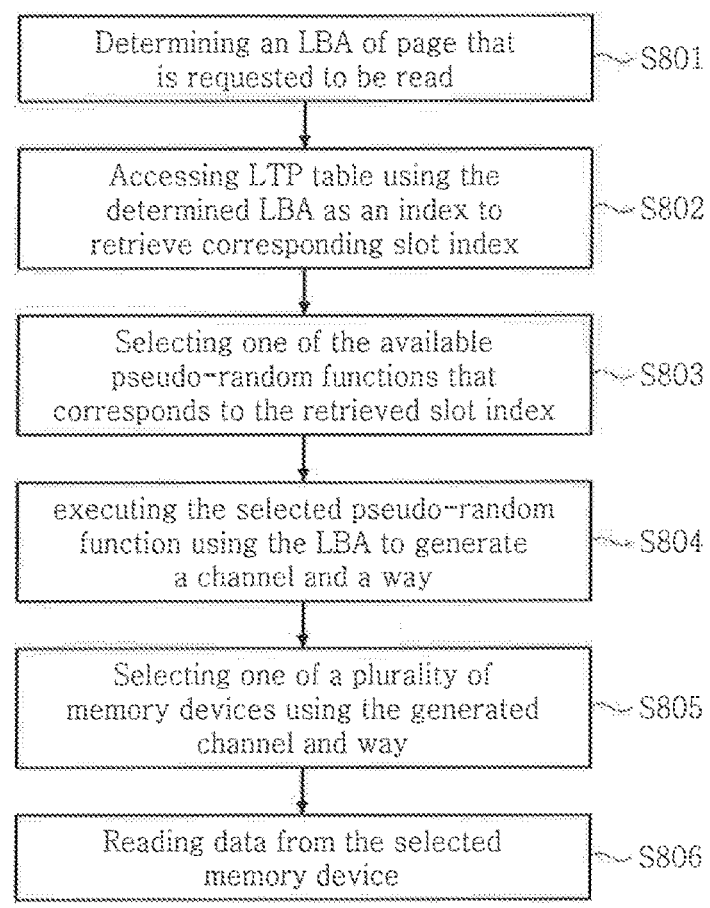
FIG. 8 illustrates a method of reading data from a memory device according to an exemplary embodiment of the inventive concept.

FIG. 8 illustrates a method of reading data from a memory system including a plurality of memory devices according to an exemplary embodiment of the inventive concept.

Referring to FIG. 8, the method includes determining an LBA of a page that is requested to be read (S801). The determination may be performed by controller 125 in response to a read request received from the host. The host controller 110 may send the read request to the SSD controller 120. The host interface 121 may pass the read request to the controller 125. The read request may include the LBA and a read command.

The method then includes accessing the L2P table using the determined LBA as an index to retrieve a corresponding slot index (S802).

The method then includes selecting one of the available pseudo-random functions that corresponds to the retrieved slot index (S803).

The method then includes executing the selected pseudo-random function using the LBA to generate a channel (e.g., identifies a channel among a plurality of channels) and a way (e.g., identifies a way among a plurality of ways) (S804). For example, the selected function could be configured to receive the LBA as an input parameter to generate the channel and the way. If multiple planes are available, the selected function additionally generates a plane (i.e., identifies a plane among a plurality of planes) from the LBA.

The method further includes selecting one of a plurality of memory devices using the generated channel and way (S805). For example, when only one plane is present, one of the memory devices 126 can be use uniquely identified using the generated channel and way. When multiple planes are available, the memory device can be identified by additionally using a plane or plane ID generated by the executed function.

The method then includes reading data from the selected memory device (S806). The reading may be performed by accessing the L2P table using the LBA to retrieve a block ID of block within the selected memory device and a page ID of a page within the block, and then reading the data from the page associated with the page ID within a block of the selected memory device associated with the block ID.

Figure 9:
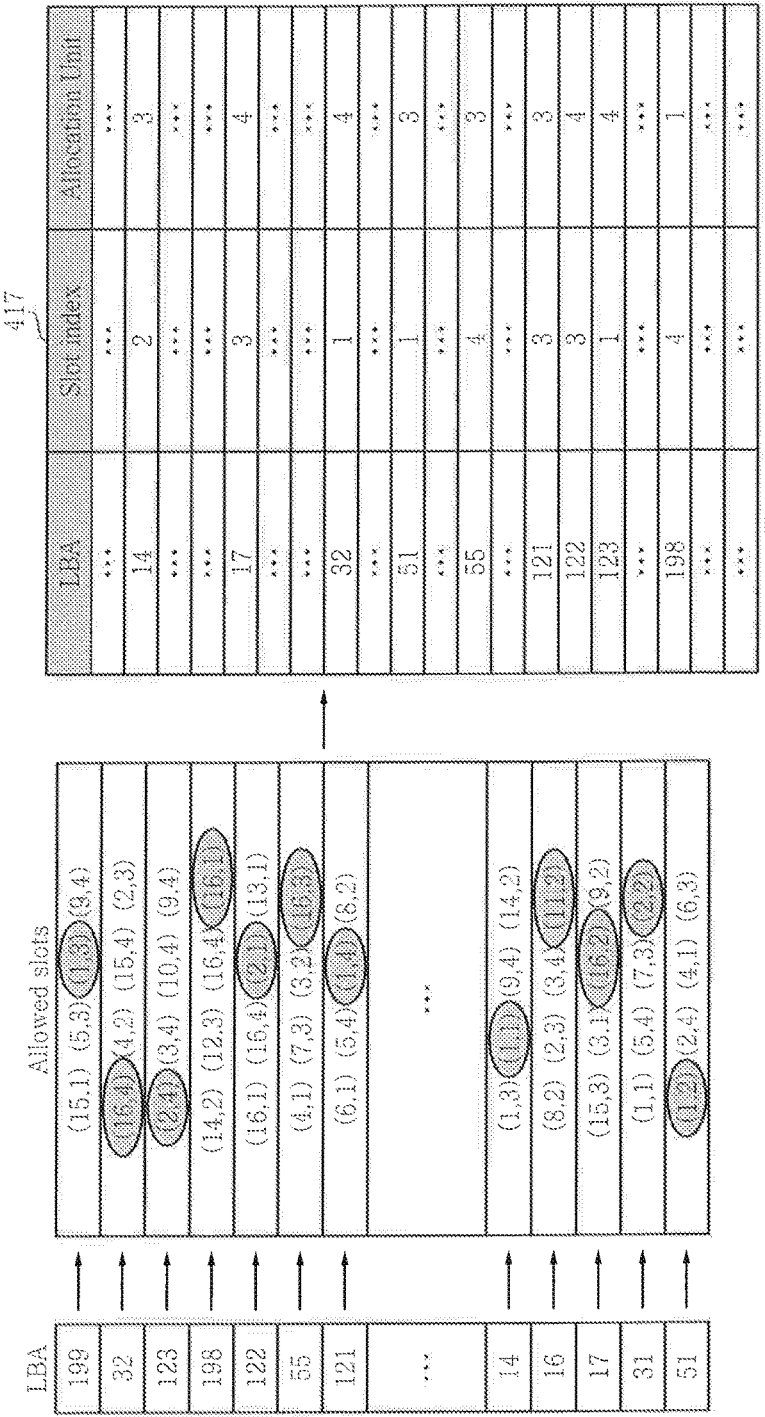
FIG. 9 illustrates another embodiment of the L2P table.

FIG. 9 illustrates another embodiment of the L2P table 317 of FIG. 5. In FIG. 9, L2P table 317 has been replaced with a revised L2P table 417. The revised L2P table 417 does not include block numbers or page numbers, and instead includes an allocation unit number. In this example, 4 available allocation unit numbers are available (i.e., 1-4). However, the inventive concept is not limited thereto as there may be a fewer number of allocation units or a greater number of allocation units. The number of available allocation unit numbers indicates the number of sets of functions (i.e., pseudo-random functions) available. For example, here there are 4 sets of functions since there are 4 allocation unit numbers available. The value of the allocation unit number for a given LBA in the L2P table 417 identifies a particular one of the sets. The number of available slot indexes indicates how many functions are available in each set. In this example, there are 4 available slot indexes, and thus each set has 4 different functions total. For example, the LBA of 14 having an allocation unit of 3 means than the third set is selected, and the LBA of 14 having a slot index of 2 means that the second function among the third set is chosen. In this example, the second function among the third set operated on the LBA produces a plane number, a channel number, a way number, a block number, and a page offset within the block identified by the block number. If a superblock has 256 pages, and there are 4 allocation unit numbers, the size of a given allocation unit is 64 pages. In another embodiment, the slot index is associated with a first function, which when operated on the LBA returns the plane number, channel number, and way number, the allocation unit number is associated with a particular block and second function, and the second function when operated on the LBA returns a page offset into the particular block.

Figure 10:
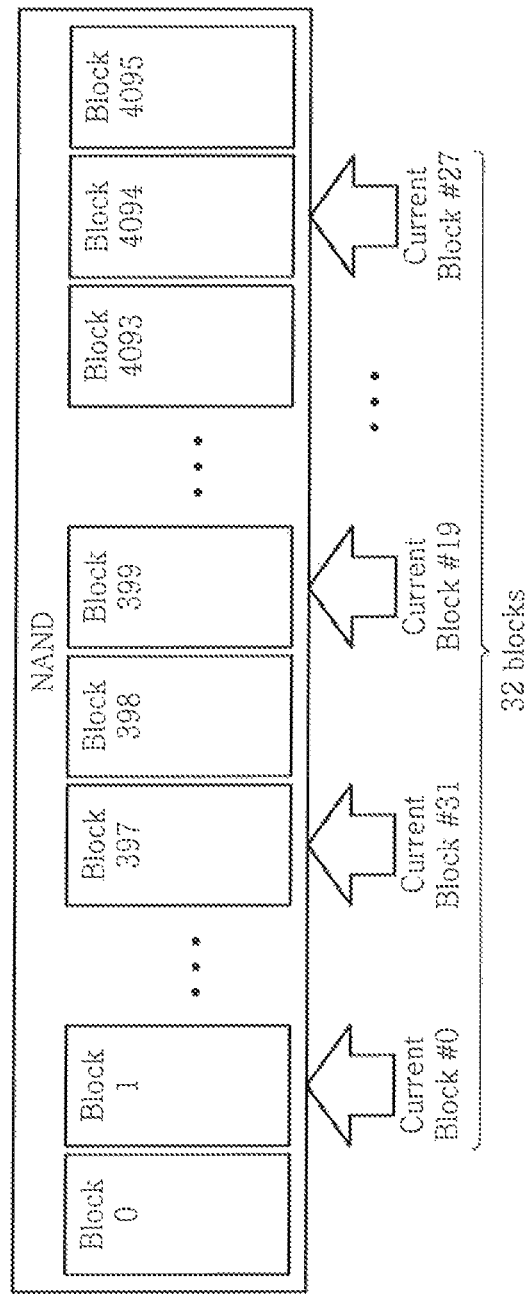
FIG. 10 illustrates the controller maintaining a list of current blocks for use with an open block technique according to an exemplary embodiment of the inventive concept.
Figure 11:
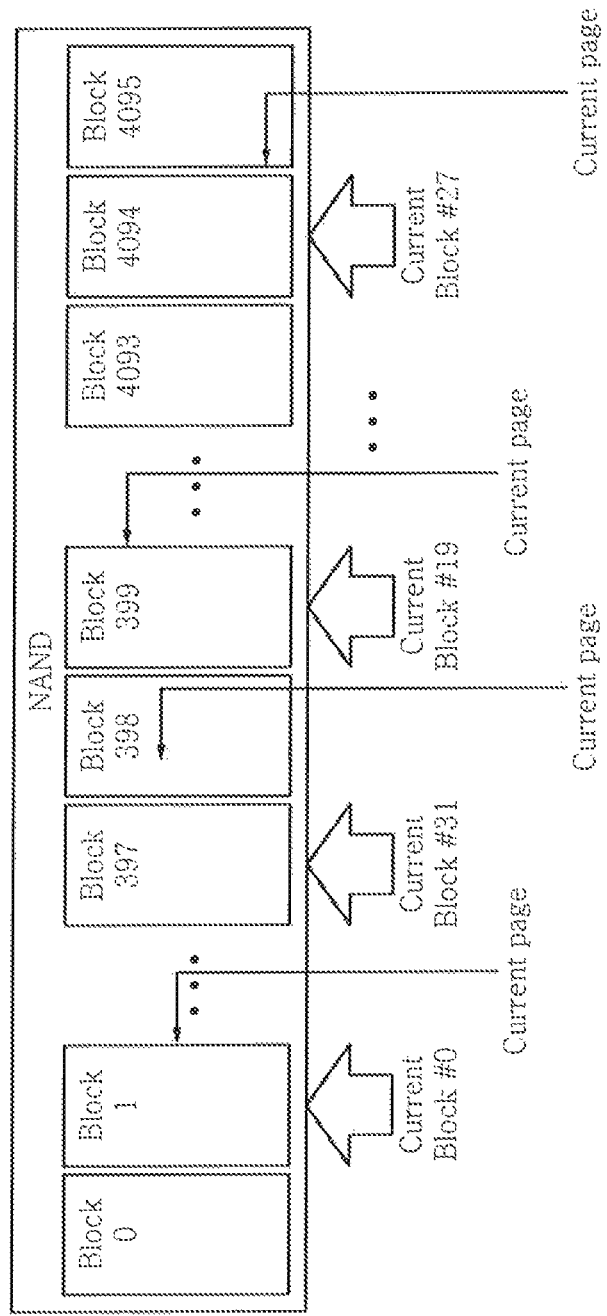
FIG. 11 illustrates the controller maintaining an index for current pages for use with the open block technique according to an exemplary embodiment of the inventive concept.
Figure 13:
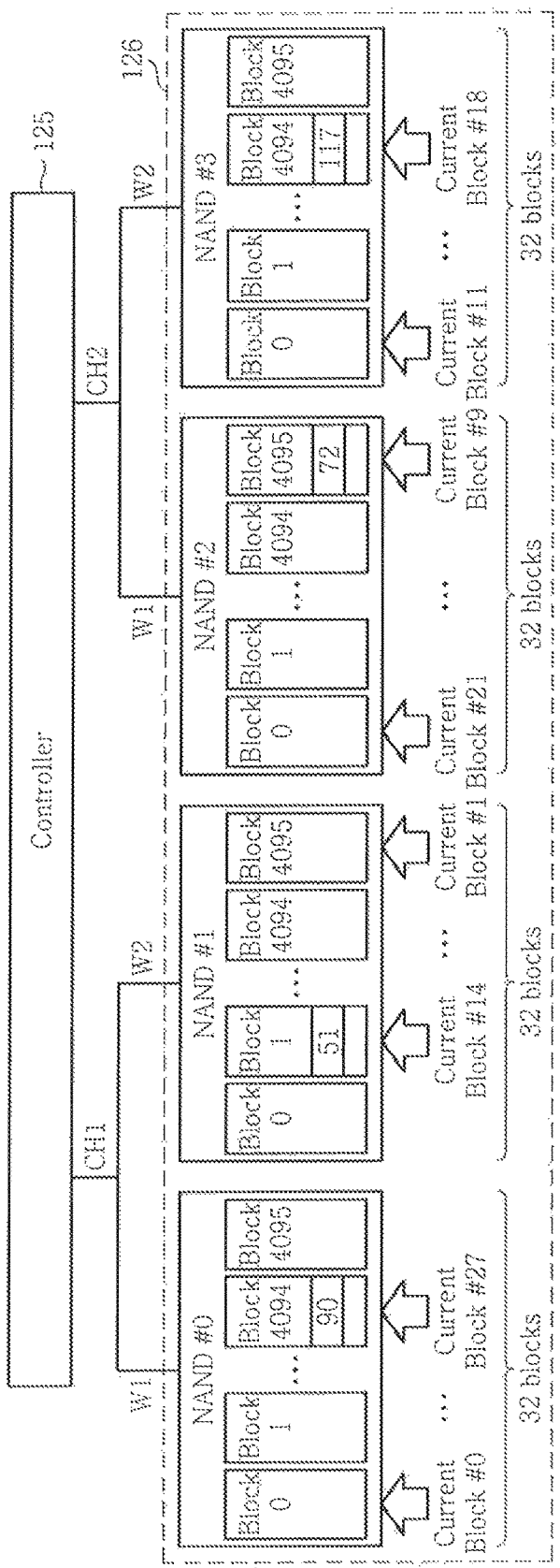
FIG. 13 illustrates use of the open block technique on a several memory devices according to an exemplary embodiment of the inventive concept.

Another embodiment makes use of an open block technique. In this embodiment, as shown in FIG. 10, the controller 125 maintains a list of a certain number (e.g., 32) of blocks ("current blocks") that are available to be written, and an associated class number. The current blocks blocks need not be consecutive. For example, when the certain number is 32, there are 32 classes such as 0, 1, 31. For example, if block 1, block 397, block 399, and block 4094 are part of the list, block 1 could be part of class 0, block 397 could be part of class 31, block 399 could be part of class 19, and block 4094 could be part of class 27. As shown in FIG. 11, for each of the 32 current blocks, the controller 125 maintains the index of the "current page" where data is next to be written. For example, if each block is 64 pages, the index could be a value from 0 to 63. If the host requests a write to a page at a particular LBA, a pseudo-random function is operated on the LBA to yield one of the class numbers. For example, if the predefined function operated on an LBA of 51 yields a class number of 19, then the controller 125 knows it can write the data to the page identified by the index associated with class number 19. For example, if the index associated with class number 19 is page 45, then the data would be written to page 45 of the block associated with class number 19, namely block 399. As shown in FIG. 12, in an exemplary embodiment, a block map table 517 used to map all blacks to a unique class and in-class index. For example, block 399 belongs to class 19 and in-class 1 in FIG. 12. In an embodiment, the block map table 517 is stored in RAM 130, and is changeable throughout the SSD lifetime. In an alternate embodiment, the block map 517 is fixed and stored in a ROM of the controller. FIG. 13 shows an example, where the open block technique is used when multiple memory devices are present. In this example, four NAND memory devices are used with 2 channels and 2 ways. The controller 125 maintains 32 current blocks (open blocks) for each of the 4 memory devices (e.g., 4×32 current blocks). In this example, the host has request writes to pages having LBAs of 51, 72, 90, and 117. In an exemplary embodiment, the controller 125 uses a first pseudo-random function to select a channel and a way for each of the LBAs. In this example, the first pseudo-random function was operated on the LBA of 51 to yield a first channel CH1 and a second way W2, on the LBA of 72 to yield a second channel CH2 and a first way W1, on the LBA of 90 to yield the first channel CH1 and the first way W1, and on the LBA of 117 to yield the second channel CH2 and the second way W2. The controller 125 maintains, for the 32 current blocks of each NAND device, a mapping of class numbers to current blocks. In this example, block 0 and block 4094 of NAND #0 are mapped to class 0 and class 27, respectively; block 1 and block 4095 of NAND #1 are mapped to class 14 and class 1, respectively; block 0 and block 4095 of NAND #2 are mapped to class 21 and class 9, respectively; and block 0 and block 4094 of NAND #3 are mapped to class 11 and class 18, respectively. Each class is in turn mapped to a particular index that identifies a particular page within a given block. The controller 125 then uses a second pseudo-random function to operate on each of the LBAs to yield a class number to determine the current block and the current page so that data associated with the corresponding LBA can be written to the current in the current block.

At least one of the above methods of writing and reading uses slots that enable a smaller L2P table to be used since the channel and way, or the channel, way and plane can be replaced with a slot index of a corresponding one of the slots. However, when the above method is applied, some of the slots may not be assigned to any LBA (i.e., some slots are wasted), thereby resulting in reduced input/output operations per second. Accordingly, various exemplary embodiments are provided below to reduce the number of wasted slots.

The number of wasted slots may be reduced by increasing the number of allowed slots. FIG. 14 shows an example, where the number of allowed slots has been increased from four to eight. Thus, in this example, the number of available functions 315 would also increased from four to eight. However, by increasing the number of allowed slots, for a given LBA, the controller 125 would need to scan through many more allowed slots before finally settling on a given slot assignment. Thus, in an embodiment of the invention, the controller 125 is designed to more frequently selected lower-index slots. For example, the controller 125 could be designed to select a slot of an index of 1 at a first frequency F1, select a slot of an index of 2 at a second frequency F2, select a slot of an index of 3 at a third frequency F3, select a slot of an index of 4 at a fourth frequency F4, select a slot of an index of 5 at a fifth frequency F5, select a slot of an index of 6 at a sixth frequency F6, select a slot of an index of 7 at a seventh frequency F7, and select a slot of an index of 8 at an eighth frequency, where F1>F2>F3>F4>F5>F6>F7>F8. However, increasing the slots from four to eight also increases the number of bits needed to store the slot index. Thus, in an embodiment of the invention, the slot index is compressed.

As discussed above, the controller may be designed to more frequently select lower index slots. For example, if slot indexes of 1-4 are available, the controller could be configured to more frequently select slot index 1 and 2 since the first two slot indexes can be stored with a single bit (e.g., 0 to represent slot index 1 and 1 to represent slot index 2).

Figure 15:
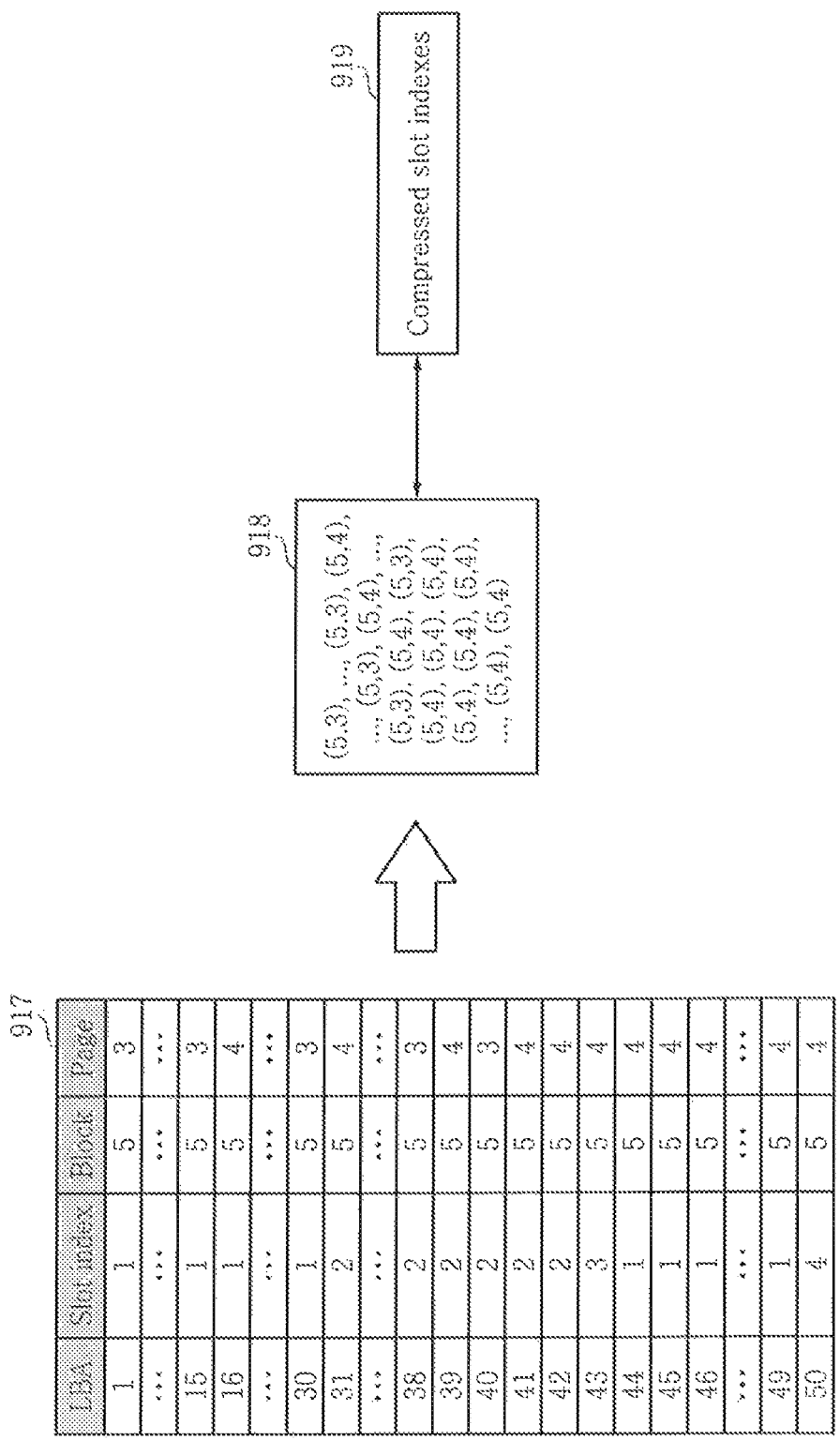
FIG. 15 illustrates a compressing of slot indexes according to an exemplary embodiment of the inventive concept.

FIG. 15 illustrates an example of a L2P table 917 that was created by a controller 125 that was configured to more frequently select lower slot indexes (i.e., slot indexes requiring a minimum number of bits to represent them). The L2P table 917 can be stored temporarily and then replaced with two smaller data tables or entities 918 and 919 that are stored permanently. For example, the first data entity 918 stores consecutive pairs of block numbers and page numbers for a number (e.g., 50) of consecutive LBAs of the L2P table 917, and the second data entity 919 is a compressed version of the slot indexes of the L2P table 917. For example, since the first 30 LBAs have slot index 1, rather than store 30 1s, a single bit representing 1 (e.g., 0) can be stored with a value (e.g., 30) indicating how often the 1 repeats, since the next 12

LBAs have slot index 2, rather than store 12 2s, a single bit representing 2 (e.g., 1) can be stored with a value (e.g., 12) indicating how often the 2 repeats, etc. Compression techniques other than the one described above may be used in alternate embodiments.

If a large number (e.g., 64) of pages is written during each writing interval, there should be less or no wasted slots. Thus, in an exemplary embodiment of the inventive concept, the controller 125 delays writing until it has received a certain number of page writes. For example, if this number is 64, and the controller receives a request for 4 page writes at time 1, rather than immediately processing the 4 page writes, the controller 125 waits until it receives another 60 pages writes. For example, if the controller 125 then receives 60 pages writes at time 2, it can then process all 64 pages writes together using the above-described write method. For example, for each LBA of the 64 page writes, the controller 125 would execute the available functions 315 to generate a slot index, write the corresponding data, and update the L2P table with the generated slot index. However, delaying the host pages to a next write may delay the response to a host "flush" command.

Figure 16:
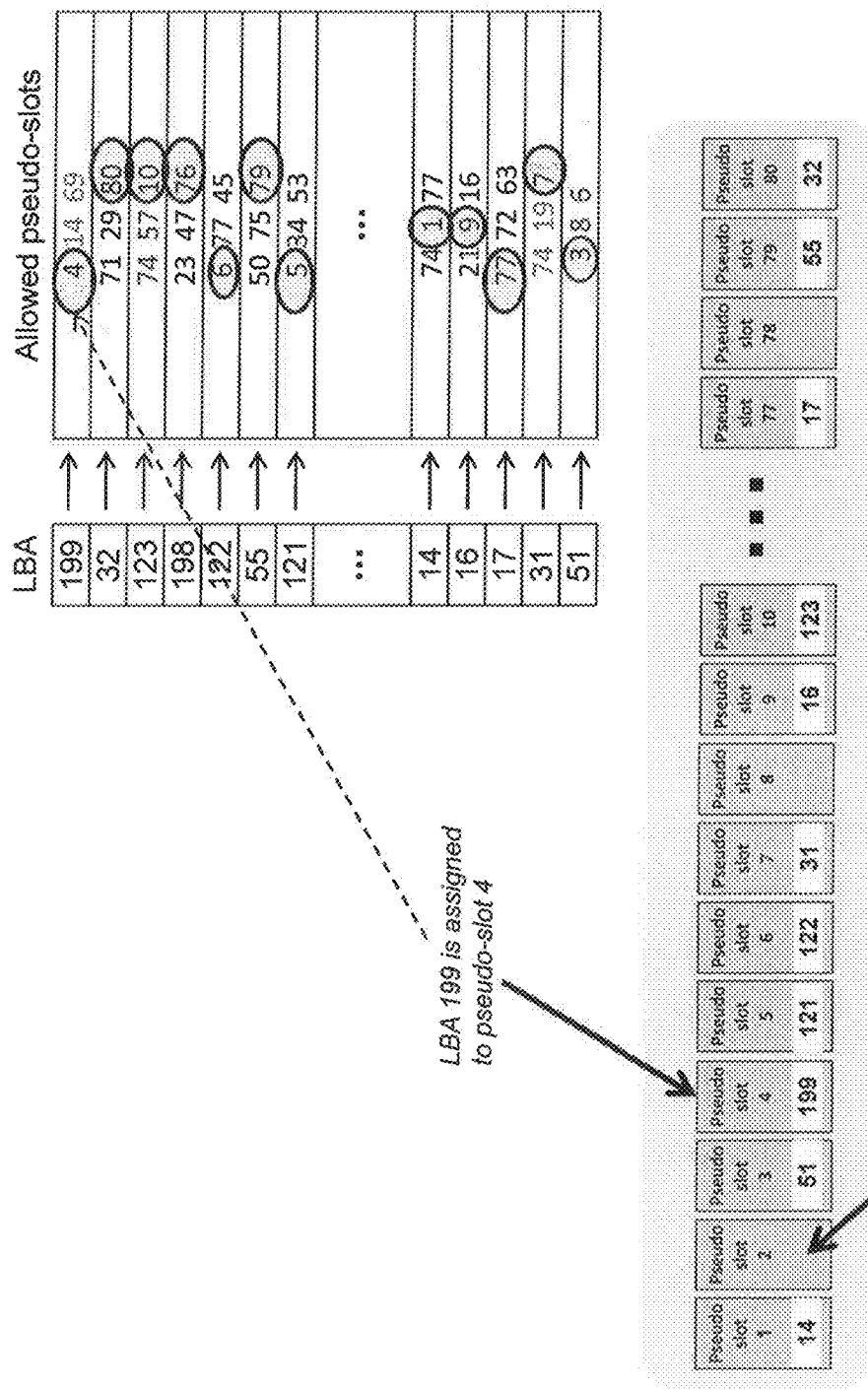
FIG. 16, FIG. 17, and FIG. 18 illustrates a method of using pseudo-slots to reducing wasted slots according to an exemplary embodiment of the inventive concept.

Another method according to an embodiment of the inventive concept that can be used to reduce wasted slots involves use of pseudo-slots. FIG. 16 illustrates a first step of the method. The controller 125 makes use of a number of pseudo-slots that is greater than the available number of memory devices. For ease of explanation, it is assumed that there are 16 channels, 4 ways, and 1 plane, so that the available number of memory devices is 64, and the member of pseudo-slots is 80. However, the number of pseudo-slots is not limited thereto and need only be greater than the number of memory devices. In this embodiment, the functions 315 shown in FIG. 5 are configured to generate a value representing one of the pseudo-slots according to a corresponding LBA. For example, the first row of the listing of allowed-pseudo slots in FIG. 5 shows that a first function of the functions 315 was operated on the LBA of 199 to generate a pseudo-slot of 4, a second function of the functions 315 was operated on the LBA of 199 to generate a pseudo-slot of 14, and a third function of the functions 315 as operated on the LBA of 199 to generate a pseudo-slot of 69. This is repeated for all LBAs in the LBA list. Then the controller 125 selects one of the allowed pseudo-slots for each LBA in the list. The selections may be performed to prevent collisions. For example, the same pseudo-slot is not assigned to two different LBAs in the LBA list. For example, in FIG. 16, the controller 125 has selected pseudo-slot 1 for LBA 14, pseudo-slot 3 for LBA 51, and pseudo-slot 4 for LBA 199. In this example, the LBA list includes the same number of LBAs as the number of available memory devices (64). Since there are more pseudo-slots than LBAs, some of the pseudo-slots are not assigned to any LBA (i.e., some pseudo-slots are empty). For ample, as shown in FIG. 16, pseudo-slots 2, 8, and 78 are empty.

Figure 17:
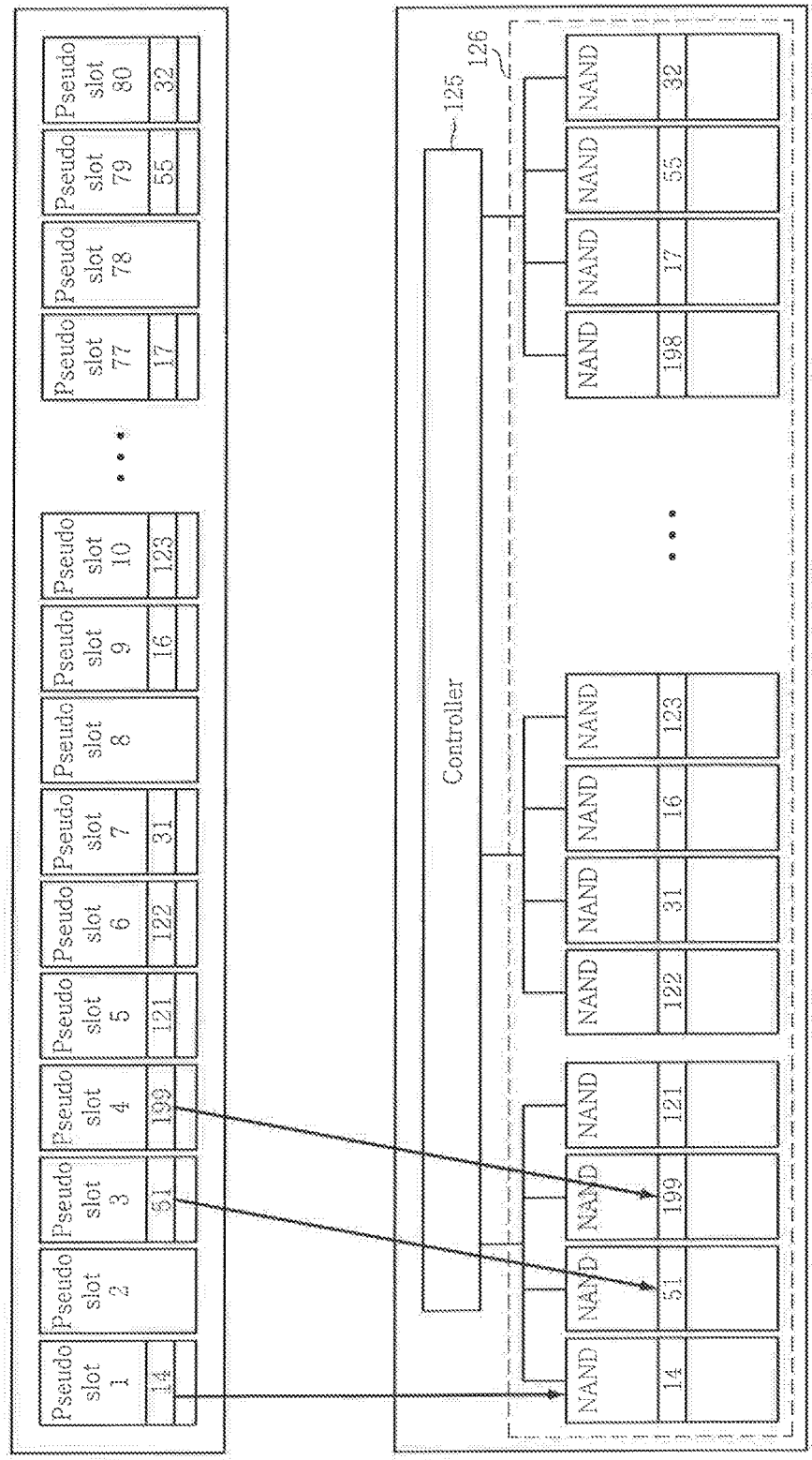

Then, as shown in FIG. 17, in order, for each pseudo-slot that is assigned an LBA, the data associated with the LBA is written to a next one of the available memory devices. Since pseudo-slot 1 is assigned to LBA 14, and the first memory located on channel 1:way 1 is not yet used, the data associated with LBA 14 is written to the first memory device. Since pseudo-slot 2 is not assigned, it is not assigned to a memory device. Since pseudo-slot 3 is assigned LBA 51, the second memory device located on channel 1:way 2 has not yet been used, LBA 51 is assigned to a second memory device located on channel 1: way2.

Figure 18:
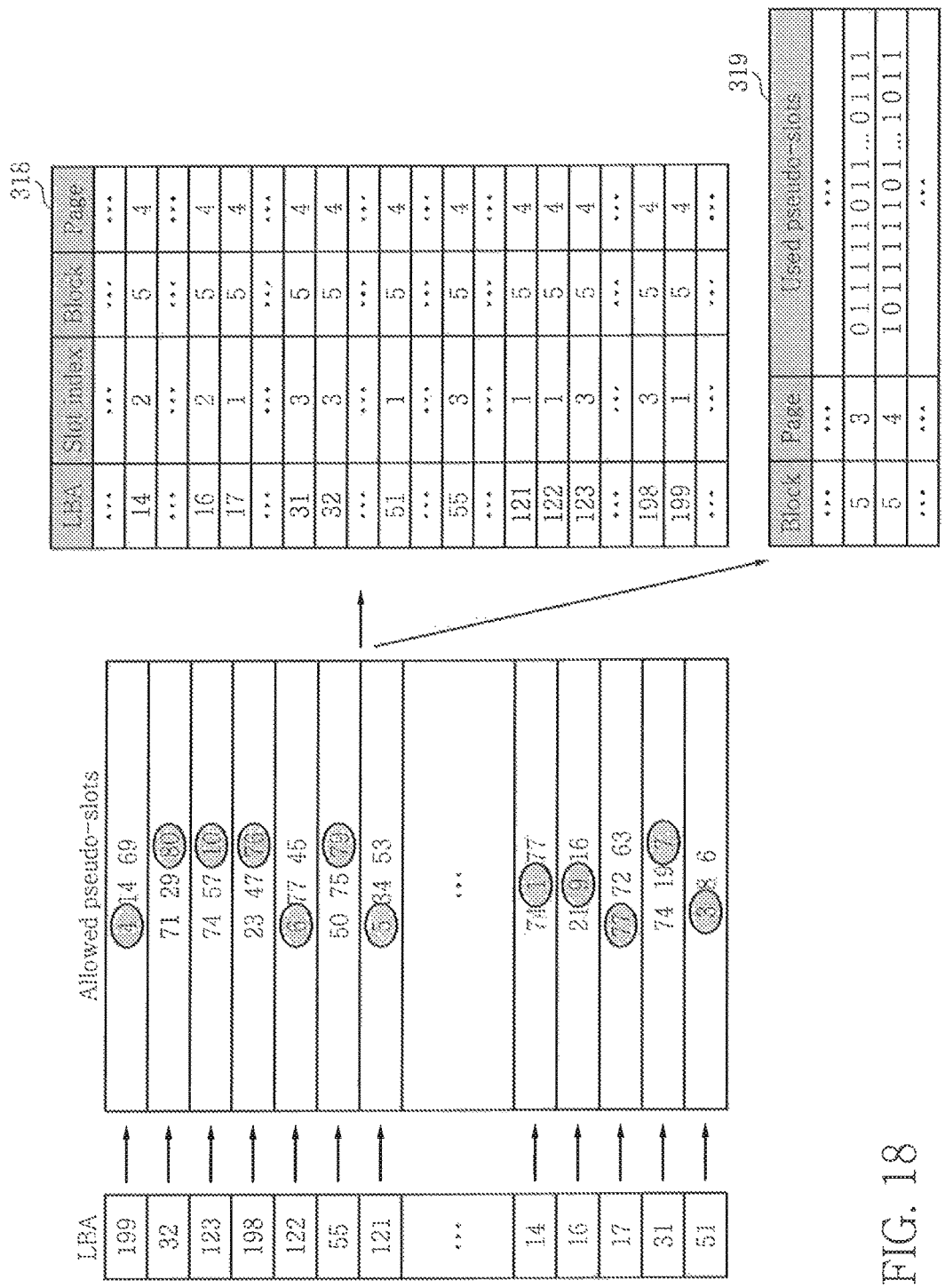

FIG. 18 illustrates generation of tables that may be used to write and read data to the memory devices using the above-described pseudo-slots. A hints table 319 may be generated to show which of the pseudo-slots have been assigned based on a currently processed LBA list associated with a given superpage. For example, as shown in FIG. 18, each row of the hints table 319 is associated with a different super page and includes a multi-bit pattern (labeled used pseudo-slots) that indicates which of the pseudo-slots is assigned. For example, the first bit of the multi-bit pattern in the row of the hints table 319 associated with block 5 and page 4 is set (i.e., 1) because pseudo-slot 1 has been assigned to an LBA of 14, the second bit of the bit pattern is clear (i.e., 0) because pseudo-slot 2 has not been assigned to any LBA, the third bit of the bit pattern is set because pseudo-slot 3 has been assigned to an LBA of 51, etc.

Data associated with the LBAs of the LBA list can be written by referring to the hints table 319. Data associated with the LBA of 14 that corresponds to the assigned pseudo-slot of 1 is written to the first memory device since bit 1 of the multi-bit pattern is set and no zero bits precede bit. Data associated with the LBA of 51 that corresponds to the next pseudo-slot of 3 is written to the second memory device since bit 3 is set and one of the preceding bits is 0 (i.e., 3−1=2). Data associated with the LBA of 16 that corresponds to the pseudo-slot of 9 is written to the seventh memory device since bit 9 is set and two of the preceding bits is 0 (i.e., 9−2=7).

Each entry of the L2P table 318 may be updated when a given one of the allowed pseudo-slots is selected for each LBA of the LBA list. When pseudo-slot 4 is chosen for an LBA of 199, since this was generated by the first function, the slot index of the entry of the L2P table 318 associated with an LBA of 199 is set to 1, when pseudo-slot 80 is chosen for an LBA of 32, since this was generated by the third function, the slot index of the entry of the L2P table 318 associated with an LBA of 32 is set to 3, etc.

The L2P table 318 can then be referenced when data needs to be read from a given one of the LBAs. For example, upon receiving a read request for a page associated with an LBA of 16, the controller 125 can reference the L2P table 318 to retrieve a slot index of 2, a block ID of 5, and a page ID of 4. Then the controller 125 can operate the $2^{nd}$ function using the LBA of 16 to return a pseudo-slot of 9. Then, the controller can refer to the row of the hints table 319 associated with a block ID of 5 and page ID of 4 to retrieve the corresponding bit pattern, and analyze its bits to determine that the data has been written to the seventh memory device. For example, as discussed above, since the 9th bit is set and 2 of the preceding bits are cleared, subtracting the number of preceding cleared bits (i.e., 2) from the value of the pseudo-slot (i.e., 9−2) yields 7 (i.e., the seventh memory device). The specific channel and way used to access the determined memory device may be determined using a look-up table.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

Although the present inventive concept has been described in connection with exemplary embodiments thereof, those skilled in the art will appreciate that various modifications can be made to these embodiments without substantially departing from the principles of the present inventive concept.

What is claimed is:

1. A memory system comprising:
a table storing a plurality of entries, where each entry is associated with a different logical block address (LBA);
a plurality of memory devices, channels, and ways, where each memory device is connected to one of the channels and to one of the ways; and
a memory controller configured to receive an input LBA and data from a host, execute a plurality of pseudo-random functions on the input LBA to generate a plurality of different slot indexes, select one of the slot indexes, write the data to one of the memory devices identified by the selected one slot index, and update a corresponding one of the entries associated with the input LBA to include the selected one slot index,
wherein the input LBA represents a location of the data.

2. The memory system of claim 1, where each slot index includes a first pseudo-random number that maps to a channel number identifying one of the channels and a second pseudo-random number that maps to a way number identifying one of the ways.

3. The memory system of claim 2, where each slot index additionally includes a third pseudo-random number that maps to a particular plane number identifying one of a plurality of planes.

4. The memory system of claim 2, wherein each pseudo-random function generates a distinct one of the slot indexes.

5. The memory system of claim 1, wherein each time a given one of the pseudo-random functions is operated on the input LBA, the given pseudo-random-function outputs a same one of the slot indexes.

6. The memory system of claim 1, wherein the memory controller is configured to receive a read LBA from the host, access an entry of the table associated with the read LBA to retrieve one of the slot indexes, a block number, and a page number, operate one of the pseudo-random functions identified by the retrieved one slot index on the read LBA to generate a channel and a way, and read data from one of the memory devices identified by the generated channel, the generated way, the retrieved block number, and the retrieved page number.

7. The memory system of claim 6, wherein the memory controller is configured to transmit the read data to the host.

8. The memory system of claim 1, wherein the memory devices are non-volatile memory devices.

9. The memory system of claim 1, further comprising a random access memory (RAM) storing the table.

10. The memory system of claim 1, wherein each slot index maps to one of a plurality of pseudo-slot indexes, a number of the pseudo-slot indexes being greater than a number of the memory devices.

11. The memory system of claim 10, further comprises a data structure indicating which of the pseudo-slot indexes are mapped to a given one of the memory devices and which of the pseudo-slot indexes are not mapped any of the memory devices.

12. The memory system of claim 11, wherein the data is written by referencing the data structure.

13. A method of writing data to a memory system comprising a plurality of memory devices, channels, and ways, each memory device being connected to one of the channels and one of the ways, the method comprising:
determining, by a memory controller, a logical block address (LBA) that is requested to be written with data by a host;
executing, by the memory controller, a plurality of pseudo-random functions on the LBA to generate a plurality of different slot indexes;
selecting, by the memory controller one of the slot indexes;
writing, by the memory controller, the data to one of a plurality of memory devices identified by the selected one slot index; and
updating, by the memory controller, an entry of a table associated with the LBA to include the selected one slot index,
wherein the LBA represents a location of the data.

14. The method of claim 13, where each slot index includes a first pseudo-random number that maps to a channel number identifying one of a plurality of channels and a second pseudo-random number that maps to a way number identifying one of a plurality of ways.

15. The method of claim 14, where each slot index additionally maps includes a third pseudo-random number that maps to a plane number identifying one of a plurality of planes.

16. The method of claim 14, wherein each pseudo-random function generates a distinct-one of the slot indexes.

17. The method of claim 4, wherein each time a given one of the pseudo-random functions is operated on the LBA, the given pseudo-random-function outputs a same one of the slot indexes.

18. The method of claim 13, wherein the writing comprises:
determining a pseudo-slot index that the selected one slot index maps to;
referencing a data structure to determine one of the memory devices the determined pseudo-slot index maps to; and
writing the data to the determined one memory device,
wherein the determined pseudo-slot index is one of a number of pseudo-slot indexes greater than a number of the memory devices.

19. A memory system comprising:
a table storing a plurality of entries, where each entry is associated with a different logical block address (LBA);
a plurality of memory devices, channels, and ways, where each memory device is connected to one of the channels and to one of the ways; and
a memory controller configured to receive an LBA from a host, access a table using the LBA to retrieve a slot index, select one pseudo-random function from among a plurality of available different pseudo-random functions using the slot index, execute the selected pseudo-random function on the LBA to generate a channel number of one of the channels and a way number of one of the ways, and read data from one of the plurality of memory devices using the generated channel number and the generated way number.

20. The memory system of claim 19, wherein the selected pseudo-random function further returns a plane number and the read further uses the returned plane number to read the data.

* * * * *